(12) United States Patent
Skalecki et al.

(10) Patent No.: US 7,525,907 B2
(45) Date of Patent: Apr. 28, 2009

(54) METHOD, DEVICE AND SOFTWARE FOR ESTABLISHING PROTECTION PATHS ON DEMAND AND REVERTIVE PROTECTION SWITCHING IN A COMMUNICATIONS NETWORK

(75) Inventors: Darek R. Skalecki, Kanata (CA); Peter J. Ashwood Smith, Hull (CA); Peter Trobridge, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1040 days.

(21) Appl. No.: 10/189,018

(22) Filed: Jul. 5, 2002

(65) Prior Publication Data

US 2004/0004937 A1    Jan. 8, 2004

(51) Int. Cl.
*G01R 31/08* (2006.01)
*G06F 15/177* (2006.01)

(52) U.S. Cl. ...................................... 370/228; 709/220
(58) Field of Classification Search ........................ None
See application file for complete search history.

(56) References Cited

U.S. PATENT DOCUMENTS

| | | | | |
|---|---|---|---|---|
| 5,241,534 A * | 8/1993 | Omuro et al. | ............... | 370/218 |
| 5,875,172 A * | 2/1999 | Tabata | .......................... | 370/228 |
| 6,222,821 B1 * | 4/2001 | Sees et al. | .................... | 370/227 |
| 6,549,513 B1 * | 4/2003 | Chao et al. | ................... | 370/227 |
| 6,721,269 B2 * | 4/2004 | Cao et al. | .................... | 370/227 |
| 6,895,441 B1 * | 5/2005 | Shabtay et al. | .............. | 709/238 |
| 6,917,759 B2 * | 7/2005 | de Boer et al. | ................. | 398/5 |
| 7,082,101 B2 * | 7/2006 | Kim et al. | .................... | 370/225 |
| 7,330,425 B1 * | 2/2008 | Gulati et al. | ................. | 370/225 |
| 2002/0172149 A1 * | 11/2002 | Kinoshita et al. | ........... | 370/216 |
| 2003/0117950 A1 * | 6/2003 | Huang | ......................... | 370/220 |
| 2004/0085899 A1 * | 5/2004 | Magill et al. | ................. | 370/230 |
| 2004/0246892 A1 * | 12/2004 | Elie-Dit-Cosaque et al. | ..... | 370/216 |

FOREIGN PATENT DOCUMENTS

WO    WO 02/43322 A2    2/2002

OTHER PUBLICATIONS

U.S. Appl. No. 09/,899,508, filed Jun. 6, 2002, Kodialam et al.
Sharma, V. et al., IETF XP-002219128: Framework for MPLS Recovery, Mar. 2001.

(Continued)

*Primary Examiner*—Chi H Pham
*Assistant Examiner*—Warner Wong
(74) *Attorney, Agent, or Firm*—Anderson Gorecki & Manaras LLP (57) ABSTRACT

In a method of providing protection switching in a meshed communications network, a protection path between two nodes on the network is only established, on demand, as it is required, after a fault along a working path between the two nodes has been detected. After the protection path is established, carriage of traffic from the working path is switched to the protection path. Once the working path is restored, traffic is switched back from the protection path to the working path, and the protection path is torn down. Switching between working and protection channels may be effected using a path establishment protocol or using protection switching mechanisms of existing network protocols, such as SONET or ATM APS. Software and network nodes embodying the method are also disclosed.

16 Claims, 6 Drawing Sheets

OTHER PUBLICATIONS

Owens, K. et al., IETFxp-002219126: A Path Protection/Recovery Mechanism for MPLS Networks, Nov. 2000.

May, K. P. et al., A fast Restoration System for ATM-Ring-Based LANs, IEEE Communications Magazine, vol. 33, No. 9, Sep. 1995.

Awduche, D., Malcolm, J., Agogbua, J., O'Dell, M. and McManus, J., RFC 2702: Requirements for Traffic Engineering Over MPLS, 1999.

Rosen, E., Viswanathan, A., and Callon, R. RFC 3031: Multiprotocol Label Switching Architecture, 2001.

Rosen, E., Tappan, D., Fedorkow, G., Rekhter, Y., Farinacci, D., Li, T., and Conta, A., RFC 3032: MPLS Label Stack Encoding, 2001.

Suzuki, M., RFC 3033: The Assignment of the Information Field and Protocol Identifier in the Q. 2941 Generic Identifier and Q.2957 User-to-User Signaling for the Internet Protocol, 2001.

Conta, A., Doolan, P., and Malis, A., RFC 3034: Use of Label Switching on Frame Relay Networks Specification, 2001.

Davie, B., Lawrence, J., McCloghrie, K., Rosen, E., Swallow, G., Rekhter, Y., and Doolan, P., RFC 3035: MPLS and LDP and ATM VC Switching, 2001.

Andersson, L., Doolan, P., Feldman, N., Fredette, A., and Thomas, B., RFC 3036: LDP Specification, 2001.

Thomas, B., and Gray, E., RFC 3037: LDP Applicability, 2001.

Nagami, K., Katsube, Y., Demizu, N., Esaki, H., and Doolan, P., RFC 3038: VCID Notification over ATM link for LDP, 2001.

Ohba, Y., Katsube, Y., Rosen, E., and Doolan, P., RFC 3063: MPLS Loop Prevention Mechanism, 2001.

Rekhter, Y., and Rosen, E., RFC 3107: Carrying Label Information in BGP-4, 2001.

* cited by examiner

METHOD, DEVICE AND SOFTWARE FOR ESTABLISHING PROTECTION PATHS ON DEMAND AND REVERTIVE PROTECTION SWITCHING IN A COMMUNICATIONS NETWORK

FIELD OF THE INVENTION

The present invention relates to communications networks, and more particularly to a method, device and software for establishing protection paths in the event of fault on a working path.

BACKGROUND OF THE INVENTION

The need to provide reliable traffic transmission between communications nodes on networks has been known and understood for some time. As such, network designs often provide for protection paths across such networks to provide traffic continuity in the event of faults.

For example, synchronous optical networks ("SONET") and asynchronous transfer mode ("ATM") networks include protection switching mechanisms used to provide 1+1, 1:1, 1:n, or m:n redundancy for provisioned paths across SONET and ATM networks. In the event of a fault, exemplified by failed or degraded signal, traffic from a working path may be switched to an existing protection path, thereby limiting the effects of a fault by providing traffic continuity.

These existing protocols require configuration of both working and protection paths across the network, in advance of transporting traffic across the paths. As such, network resources are reserved so that they are available in the presence of a fault. In the extreme, two paths are used to simultaneously carry the same traffic. In the presence of a fault along one path, traffic may be immediately received from the other path. This facilitates fast protection switching and traffic restoration in the event of faults. Of course, not all traffic requires such fast protection switching.

At the same time, network operators often expect traffic to be carried along a defined path. This is especially true when network operators explicitly choose a route for traffic. As such, although operators are willing to allow traffic to be diverted if that explicit route is not available, they expect the traffic to be switched back to its original working path once any fault along it has been cleared.

Accordingly, there is a need for new network protocols, methods and devices that make efficient use of network resources, without unduly reserving network resources while allowing a level of traffic continuity.

SUMMARY OF THE INVENTION

In accordance with an aspect of the present invention, a protection path between two nodes in a meshed network is only established as it is required, after a fault along a working path between the two nodes has been detected. Thereafter, carriage of traffic from the working path is switched to the newly established protection path. Once the working path is restored, traffic is switched back from the protection path to the working path, and the protection path is torn down.

As the protection path is only created after fault on a working path, network resources are not needlessly reserved. Conveniently, as the traffic is switched back to a restored working path, the working path carries the traffic between the nodes in the absence of a fault. Network operators and maintainers may thus predict which physical resources are used to carry traffic between the nodes.

In accordance with an aspect of the present invention there is provided a method of operating a meshed communications network including: a. establishing a working path for carrying traffic between a source node and a destination node; b. in the presence of a fault along the working path, establishing a protection path, between the source and the destination node; c. switching carriage of traffic from the working path to the protection path; and d. upon restoration of the working path, switching carriage of the traffic from the protection path to the working path, and tearing down the protection path.

In accordance with another aspect of the present invention there is provided a node in a meshed network, the node includes a control processor to establish paths across the meshed network using a path establishment protocol. The node carries traffic across the meshed network using a network protocol. The node is operable to: a. establish a working path for carrying traffic between the node and a destination node using the path establishment protocol; b. in the presence of a fault along the working path, establish an alternate protection path, between the node and the destination node, using the path establishment protocol; c. switch carriage of traffic from the working path to the protection path; and d. upon restoration of the working path, switch carriage of the traffic from the protection path to the working path, and tearing down the protection path.

In accordance with yet a further aspect of the present invention there is provided a computer readable medium, storing processor readable instructions loadable at a node within a meshed network. The instructions adapt the node to: a. establish a working path for carrying traffic between a source node and a destination node; b. in the presence of a fault along the working path, establish an alternate protection path, between the source and the destination node; c. switch carriage of traffic from the working path to the protection path, after establishment of the protection path; and d. upon restoration of the working path, switch carriage of the traffic from the protection path to the working path, and tear down the protection path.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
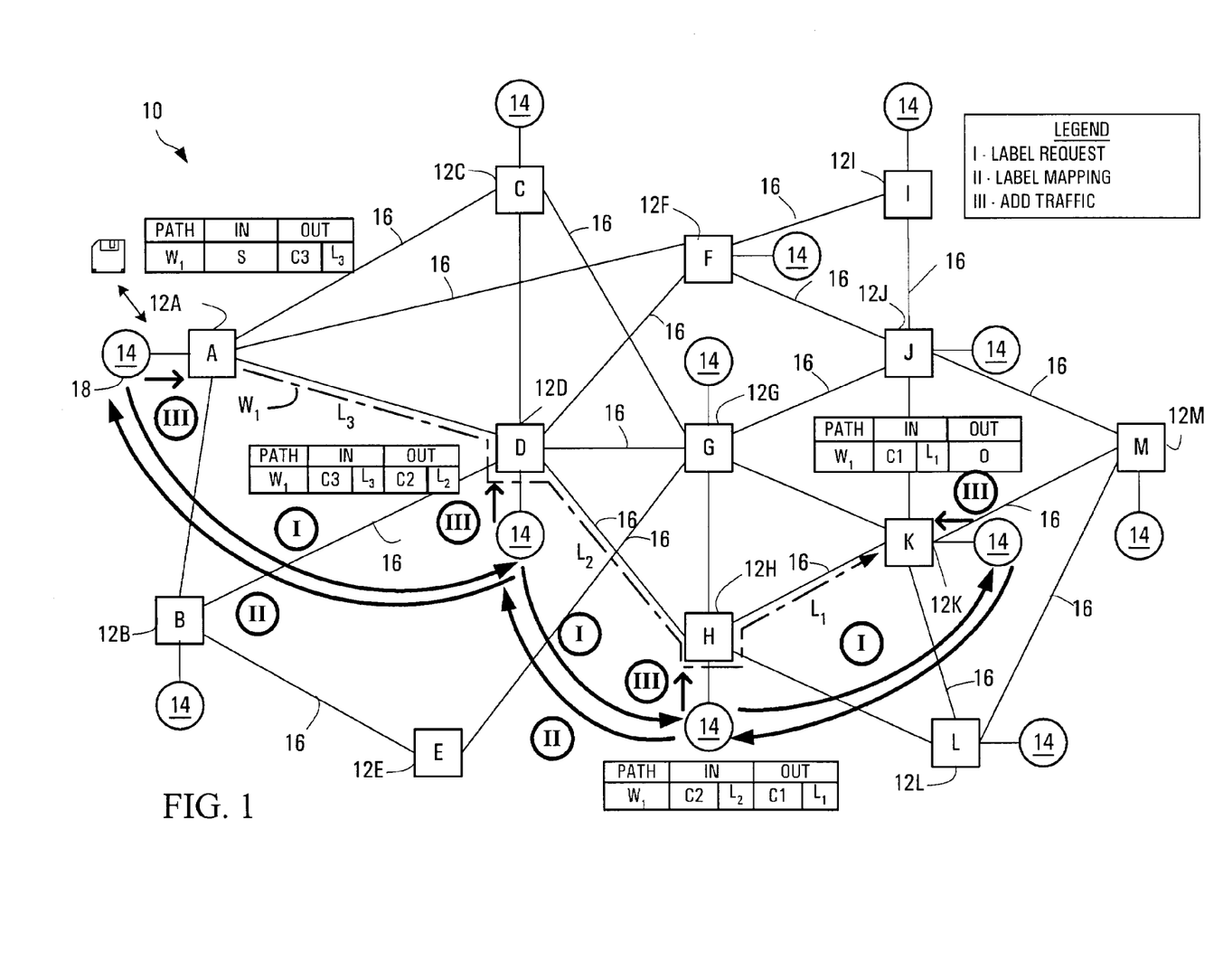
FIG. 1 illustrates a communications network exemplary of an embodiment of the present invention, including an established working path.

FIG. 1 illustrates an exemplary communications network 10 including a plurality of communication network nodes 12a-12k (individually and collectively referred to as nodes 12, individually referred to as nodes A, B, C, . . . K). Each of nodes 12 is physically interconnected to one or more of the remaining nodes 12, by physical links 16, for the transport of traffic. The links may, for example, be fiber optic cables or the like. Network 10 is exemplary of a mesh connected network: nodes are interconnected to multiple neighbouring nodes. Network 10 may be a single network, or may be a collection of interconnected sub-networks.

Each node 12 is a conventional communications node, such as an optical cross-connect, a network router, an ATM switch, or the like. Each node 12 is preferably associated with a connection controller 14 that is under software control and allows the establishment of connections at nodes 12 and thereby communication paths between pairs of nodes 12, using a path establishment protocol.

A connection controller 14 may be integrated with an associated node 12 or may be a separate physical processor in communication with an associated node 12. Connection controllers 14 of the multiple nodes 12 may further be in communication with each other by way of signaling links (not illustrated). These signaling links are preferably, but not necessarily, physically distinct from links 16. They may be links on a network suitable for transport of signaling data. An appropriate signaling network may, for example, be an internet protocol (IP) compliant network, or the like.

Network nodes 12 may further support other network protocols for the transport of data across network 10 by way of links 16. Suitable protocols may for example include asynchronous transfer mode protocols (ATM), synchronous optical networking protocols (SONET), synchronous digital hierarchy (SDH) protocols, wavelength division multiplexing (WDM) protocols, or the like.

Established traffic carrying paths between pairs of source and destination nodes typically include individual traffic carrying channels established along traffic carrying links 16 between adjacent ones of nodes 12. A collection of channels across multiple links connects source to destination node, to establish the path to permit traffic flow between the nodes.

Paths between nodes 12 may be established by controllers 14 using known path establishment protocols modified to function in manners exemplary of the present invention and embodied in software at the nodes. Known path establishment protocols include multi-protocol label switched path (MPLS), in the case of IP compliant networks; generalized multi-protocol label switched path (GMPLS) switching (also referred to as multi-protocol lambda switched path (MPλS)), or G.ASON compliant networks, in the case of optical networks; ATM-PNNI in the case of ATM networks. Other path establishment protocols will be readily known to those of ordinary skill.

For ease of illustration only, network 10 will be described as an MPLS compliant network, with each of controllers 14 supporting MPLS for path establishment, and further optionally supporting MPLS Traffic Engineering extensions, as for example detailed in the Internet Engineering Taskforce, Request For Comments (IETF RFCs) 2702, 3031, 3032, 3034, 3035, 3036, 3037, 3038, 3033, 3063, and 3107.

As such, exemplary software including instructions to be executed by processors at each node may be loaded from a computer readable medium, such as medium 18. Exemplary software adapts nodes 12 (and in particular controllers 14) to support necessary network and path establishment protocols, and function in manners exemplary of embodiments of the present invention.

The degree of modification to software embodying conventional protocols will vary depending on the nature of the path establishment protocol, and the network protocol supported at each node. It is expected that such modification is within the skill of a person of ordinary skill in the art.

Use of a path establishment protocol allows traffic carrying paths to be established under processor control, possibly dynamically. Once traffic carrying paths are established, existing network protocols may conveniently be used with little or no modification to transport traffic along the established paths.

In order to establish a communications path across network 10, any path establishment mechanism forming part of MPLS (such as the MPLS label distribution protocol (LDP), or constraint-based routing LDP (CR-LDP)) may be supported at controllers 14.

Now, a controller 14 at a source node, such as node A may establish a working path across network 10 in order to exchange traffic with a destination node, in a conventional manner. For purposes of illustration, a controller 14 at node A may establish a working path with a controller at an example destination node K, to exchange traffic between node A and node K.

As noted, in order to establish this working path, any suitable signalling protocol understood by controllers 14 may be used. For example, MPLS label distribution protocol may be supported at the nodes and may be used to establish the working path (A-K). As will be appreciated, the LDP may be used to establish label switched paths (LSPS) across network 10. LSPs may be established automatically by the network 10, or explicitly at the controller 14 of the source node (referred to as explicitly routed label switched paths (ER-LSPs)).

Explicitly routed paths may be established by a controller 14 at a source node, using information about the topology of the network known at the source node. Information about the topology of network 10, for example, may be stored in a database or data structure local to node A. This information about network 10 may be used to route the path. The information available to the controller 14 at node A may be provided by conventional routing protocols, such as OSPF, or ISIS. Of course, information about the topology of network 10 need not be stored locally at node A, but instead may be stored remotely and retrieved as required.

Establishment of an exemplary communications path W1 (in this case an explicitly routed LSP) from node A to node K is illustrated in FIG. 1. So, for example, an ER-LSP used to establish the route may include identifiers of nodes D, H and K (e.g. ROUTE=D, H, K). Identifiers of controllers 14 at nodes D, H, and K may take the form of network addresses for those controllers 14. In a conventional manner, the path establishment message may be passed from node A to nodes D, H and K. The path establishment message is illustrated with the Roman numeral I (LABEL REQUEST message I) in FIG. 1. Once the path establishment message is received at node K, a label allocation message (FIG. 1—LABEL MAPPING message II) may be passed automatically, back to source node A. Labels at each of nodes D, H and K are established as the label allocation message is passed from node K to node A. The labels, in turn, are used to forward signalling messages between adjacent controllers 14, and collectively from the controller at node A to the controller at node K.

Upon receipt of the label mapping message, each controller 14 passes a message (ADD TRAFFIC message III—FIG. 1) to an associated node 12 to allocate traffic carrying channel at that node. Thus, for each label at each controller 14, a further corresponding traffic carrying channel on links 16 is allocated between adjacent nodes 12 (illustrated as C1, C2, and C3 in FIG. 1). Depending on the network protocol(s) supported at nodes 12, channels between nodes 12 may take various forms. For example, for a WDM network a channel may be a wavelength of light. For an ATM network, a channel may be a virtual channel. For a SONET network, a channel may be a SONET tunnel. These traffic carrying channels may be allocated on links 16 between nodes 12 as path establishment message is being passed downstream from controller at node A to controllers at nodes D, H and K, or alternatively as label allocation messages are passed from controller at node K to controllers at nodes H, D and A (as in FIG. 1).

FIG. 1 further illustrates exemplary label and traffic carrying channels assigned for a working path W1 at nodes A, D, H and K and associated controllers 14.

Now, in order to pass a signalling message from node A to node K along LSP W1, the message may be associated with label L3 at controller A, and passed to controller D, with label L2 at controller D and passed to controller H, with label L1 at controller H and passed to controller K. Similarly, traffic from a source channel S destined from node A to a destination channel O at node K along W1 is associated with traffic carrying channel C3 at node A and passed to node D, traffic carrying channel C2 at nodes D and passed to node H, with traffic carrying channel C1 at node H and passed to node K. The data may be passed between source and destination nodes using one or more conventional network protocols supported at nodes 12 such as, for example, ATM SONET, SDH, WDM or the like.

Conveniently, some existing network protocols support automatic protection switching ("APS") mechanisms, allowing traffic to be transported along alternate paths between pairs of source and destination nodes, in the event of network faults. SONET/SDH and ATM, for example, support automated protection switching, as for example detailed in ITU-T Recommendations G. 783 for SONET/SDH; and ITU-T Recommendations I. 610, I. 630 for ATM.

As such, for any working path such as W1, a protection path could be established across network 10. In the event of a fault along W1 traffic could be switched to the protection path using a protection switching mechanism that forms part of the underlying network protocol.

Typically, however, these protection switching mechanisms switch traffic between working paths and already existing protection paths at the time of fault. Existing protection mechanisms, for example reserve one protection path for each working path (as in 1+1 or 1:1 protection switching), or one or more protection paths for n working paths (as in 1:n and m:n protection switching). Consequently, such protection switching typically requires multiple paths between source and destination nodes. As will be appreciated, this may reserve network resources that go unutilized in the absence of a fault. Of equal significance, establishment of a multitude of paths on a mesh network, such as network 10, may complicate future path establishment, particularly where paths are determined using constraints based on existing paths.

Accordingly, in manners exemplary of the present invention, controllers 14 establish protection paths between pairs of source and destination nodes across network 10, only as required. In the presence of a fault along the working path W1, a protection path P1 is established and traffic carried along W1 is directed to protection path P1 in a manner exemplary of an embodiment of the present invention, in order to preserve the ability of network 10 to carry traffic between nodes A and K in the event of the faults. Once faults along W1 are cleared, traffic carried along protection path P1 is switched back (reverted) to the working path W1 and protection path P1 is torn down.

Figure 2:
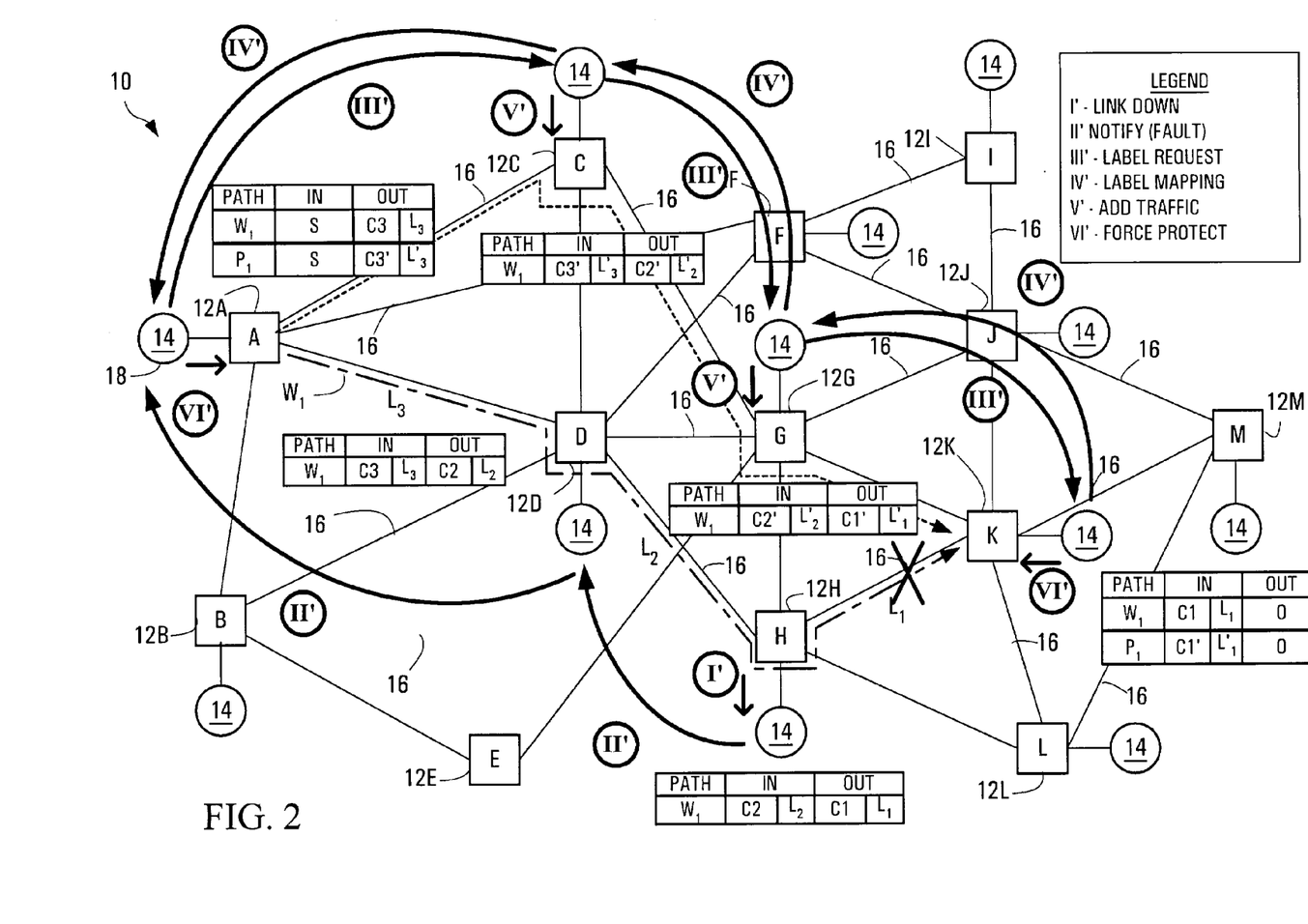
FIG. 2 illustrates the communications network of FIG. 1, including an established working path and corresponding protection path, established in a manner exemplary of an embodiment of the present invention.
Figure 3:
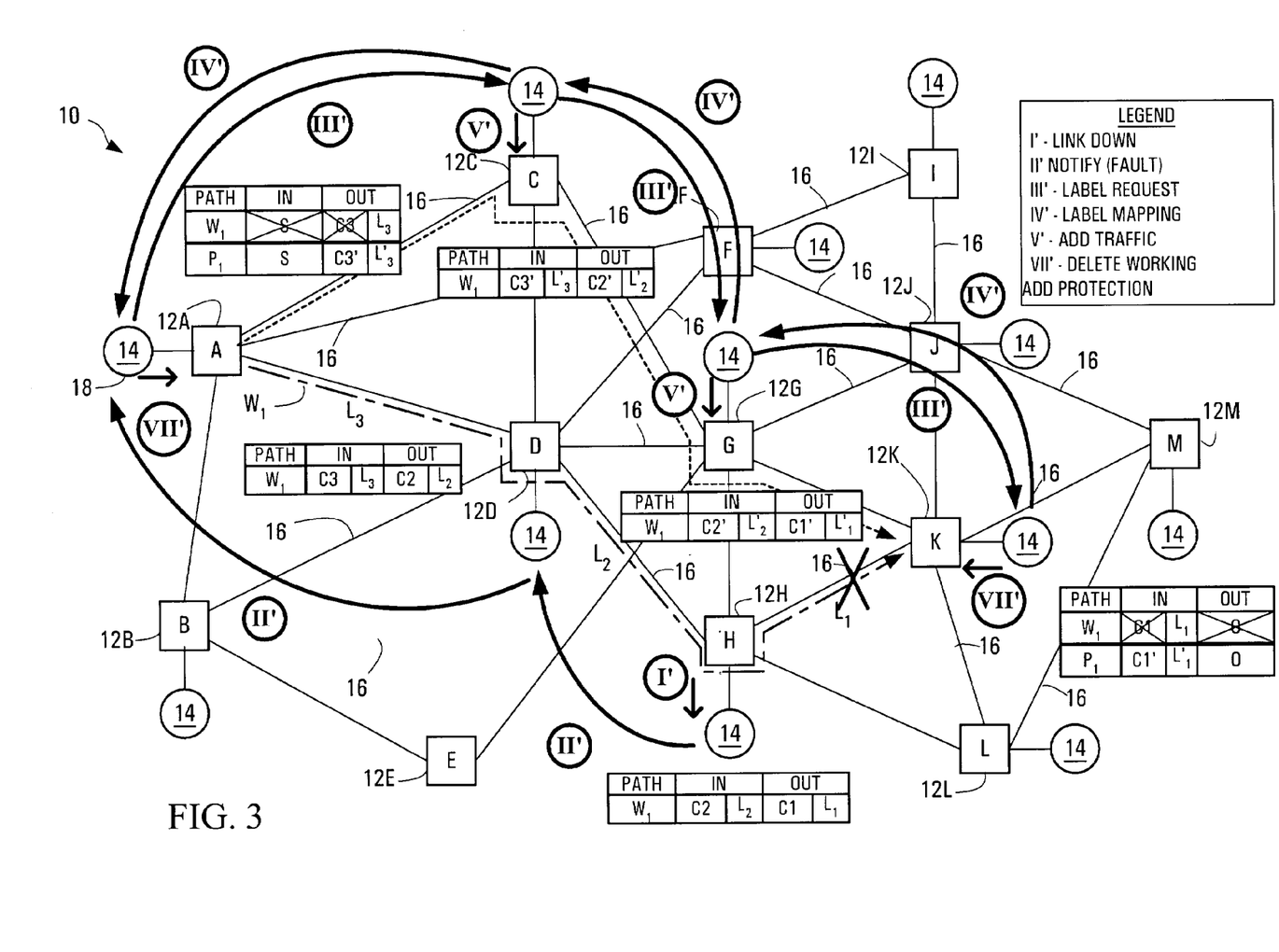
FIG. 3 illustrates the communications network of FIG. 1, including an established working path and corresponding protection path, established in a manner exemplary of another embodiment of the present invention.

FIGS. 2 and 3 accordingly illustrate a hypothetical fault between nodes H and K along path W1 on network 10. Possible resulting signalling messages are illustrated in FIGS. 2 and 3. In the examples, the fault along the working path W1 does not result in a fault along the signalling path interconnecting controllers 14. As such, signalling messages may still be sent between controllers 14.

The fault between nodes H and K may, for example, be the result of a complete loss of signal between nodes H and K along connecting link 16, or a degraded signal. The fault is likely first detected by the network protocol used to transport data between the nodes. Now, upon detecting the fault at node H, immediately upstream of the failure, the connection controller 14 associated with the upstream node H is provided with a message (LINK DOWN message I'—FIGS. 2, 3) indicative of the fault. Controller 14 at node H, in turn, passes a message (NOTIFY (FAULT) message II'—FIGS. 2, 3) indicative of the fault upstream in the direction of the source of the faulted path W1, along the signalling network. Preferably, the established LSP (i.e. MPLS signalling path) may be used in order to pass the message to controller 14 at node A.

Exemplary of an embodiment of the present invention, upon receipt of the signalling message at node A, controller 14 at node A reacts by establishing a protection path P1 to node K. Carriage of traffic from working path W1 is then switched to the newly established protection path P1.

As will become apparent, establishment of path P1 is done in much the same way as establishment of path W1. Switching of the carriage of traffic from and to path P1 may be effected in numerous ways.

For example, (a) path P1 may be established as a 1+1 protection path for the working path W1, using the path establishment protocol. The carriage of traffic may be switched from W1 to P1 using a protection switching mechanism forming part of the underlying networking protocol. Alternatively, (b) the protection path may be established as a protection path for the working path, using the path establishment protocol. The switch of the carriage of traffic may be explicitly initiated by the path establishment protocol, and effected using the underlying networking protocol. Alternatively (c) path P1 may be established to replace path W1 at the source and destination, by the path establishment protocol.

Figure 4:
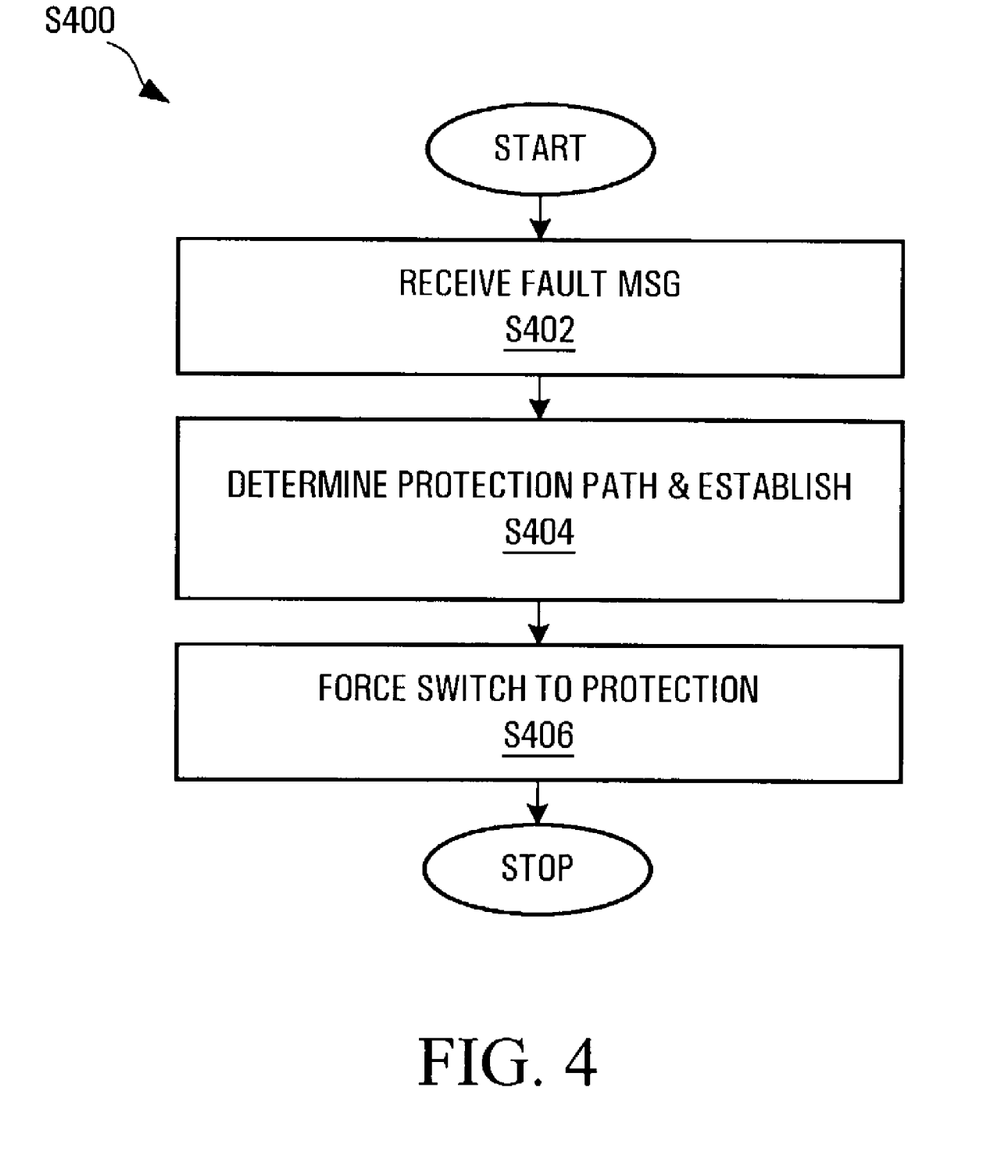
FIG. 4 illustrates exemplary steps performed at a source node of the working path of FIGS. 2 and 3, in establishing a protection path.

Examples (a), (b) and (c) are further illustrated in FIGS. 2 and 3. Exemplary steps S400 performed at controller 14 of node A are illustrated in FIG. 4. Specifically, upon receipt of a message (NOTIFY (FAULT) message II'—FIGS. 2 and 3) indicative of the fault between H and K in step S402, node A establishes a protection path corresponding to the faulted path W1 in step S404. Preferably, in step S404 the route for the protection path is computed at the source node A to avoid the faulted link between node H and node K. Determination of the protection path at node A allows establishment of an explicit protection path. Again, this path may be an LSP and may be established using GMPLS, extended as required, or the like.

An exemplary protection path P1 for working path W1 may be calculated as including nodes A, C, G and K. A path establishment message (LABEL REQUEST message III'—FIGS. 2 and 3) is dispatched from controller 14 at node A, along the determined path. Once the path establishment message is received at K, a label allocation message (LABEL MAPPING message IV'—FIGS. 2 and 3) is passed back from K to A along the established signal path. Controllers 14, in turn dispatch messages to establish traffic carrying channels at nodes 12. (ADD TRAFFIC messages V'—FIGS. 2 and 3) As part of processing these messages at controllers 14 at nodes A, C, G and K, labels and traffic carrying channels are allocated—labels at controllers 14 and traffic carrying channels on links 16 between nodes 12. Example labels and path information stored at nodes A, C, G, K are also illustrated in FIGS. 2 and 3.

In the example of FIG. 2, path P1 is established as a 1+1 protection path for working path W1. As illustrated, two interconnections at node A and node K originate with the same traffic source (S), and terminate on the same channel (O). Conveniently, as lower level network protocols such as ATM and SONET include APS mechanisms, these may now be relied upon to switch carriage of traffic from the working to protection path. Specifically, in accordance with ATM or SONET APS mechanism, detection of a fault along a working path, causes a switch of carriage of traffic from a working path to an established protection path at node A and node H. As such, in the example of FIG. 2, node A need not necessarily perform any further steps after the protection path has been established (Example (a)), to switch traffic from path W1 to path P1.

Although quite acceptable for many applications, relying on the protection switching mechanism of the network protocol has the drawback that traffic restoration only happens after protection path P1 is established and a fault in working path W1 is detected. Therefore, in order to expedite switching from working path W1 to protection path P1, controller 14 at node A may optionally explicitly initiate protection switching (Example (b)) at the network layer by issuing a suitable command to effect the switching, in step S406. Controller 14 at node A may dispatch a switch to protection command at node A upon establishment of the connection for P1 at A (illustrated as FORCE PROTECTION message VI'—FIG. 2). Controller 14 at node K may similarly dispatch an explicit switch to protection message upon establishment of the connection at node K.

In an alternate embodiment (Example (c)), illustrated in FIG. 3, connections for path W1 may be deleted at nodes A and K as the connections for paths P1 are added at these nodes, as a result of messages VII' in FIG. 3. As such, the path establishment protocol effects the switching of the carriage of traffic from path W1 to path P1. Exemplary label and traffic carrying channel assignments for P1 as stored at controllers and nodes A, C, G, K are illustrated in FIG. 3.

After a switch to protection is effected, traffic is again carried between source node A and destination node K along P1. As protection path P1 is only established after a fault along working path W1, traffic will be lost for at least the duration of the establishment of protection path P1. This will typically result in greater traffic loss than if P1 already existed at the time of the fault. This greater loss, however, may be quite tolerable to a network operator for certain classes of traffic. The advantage of not having a pre-existing protection path is that network resources are more efficiently utilized.

Working path W1 is preferably maintained after its fault. That is, the established working path at nodes A, D, H and K is not torn down after the fault on link 16 between nodes H and K occurs. As such, in the embodiments of FIGS. 2 and 3, connections for W1 are maintained at intermediate nodes 12, such as nodes D and H, and optionally at nodes A and K (as in FIG. 2). In this way, once the fault between H and K is corrected, path W1 is restored and carriage of traffic may be switched back from path P1 to path W1. Conveniently, reversion to path W1 ensures that traffic is carried along the working path W1 (and therefore by the same resources along path W1) when that path W1 has not suffered a fault.

Reversion from path P1 to path W1 may, again, be effected in any number of ways. For example, (a) traffic along working path W1 may be restored using the protection switching mechanism of the networking protocol; or (b) protection path P1 may again be replaced by W1 by the path establishment protocol.

In one embodiment (Example (a)—not specifically illustrated), provided that working and protection paths W1 and P1 are established as 1+1 working and protection paths (as in FIG. 2) reversion may be effected by the underlying protection switching mechanism associated with the network protocol. So, once path W1 is restored, the protection switching mechanism forming part of the network protocol automatically reverts to path W1, causing carriage of traffic along path W1. As will be appreciated, reversion to path W1 may occur after some time, once the network protocol detects the re-establishment of path W1. No further signalling messages between nodes K and A (or associated controllers 14) are required.

Once the revertive switching has been performed at nodes A and K, a message may be sent from node A to its associated controller 14. Controller 14 may then begin termination of path P1 by dispatching a path termination message causing the labels and traffic carrying channels of P1 to be de-allocated at nodes C, G and K, and causing associated traffic connection to be removed. Similarly the association connection at node A is removed. Resources previously used or reserved along P1 are thus freed.

Figure 5:
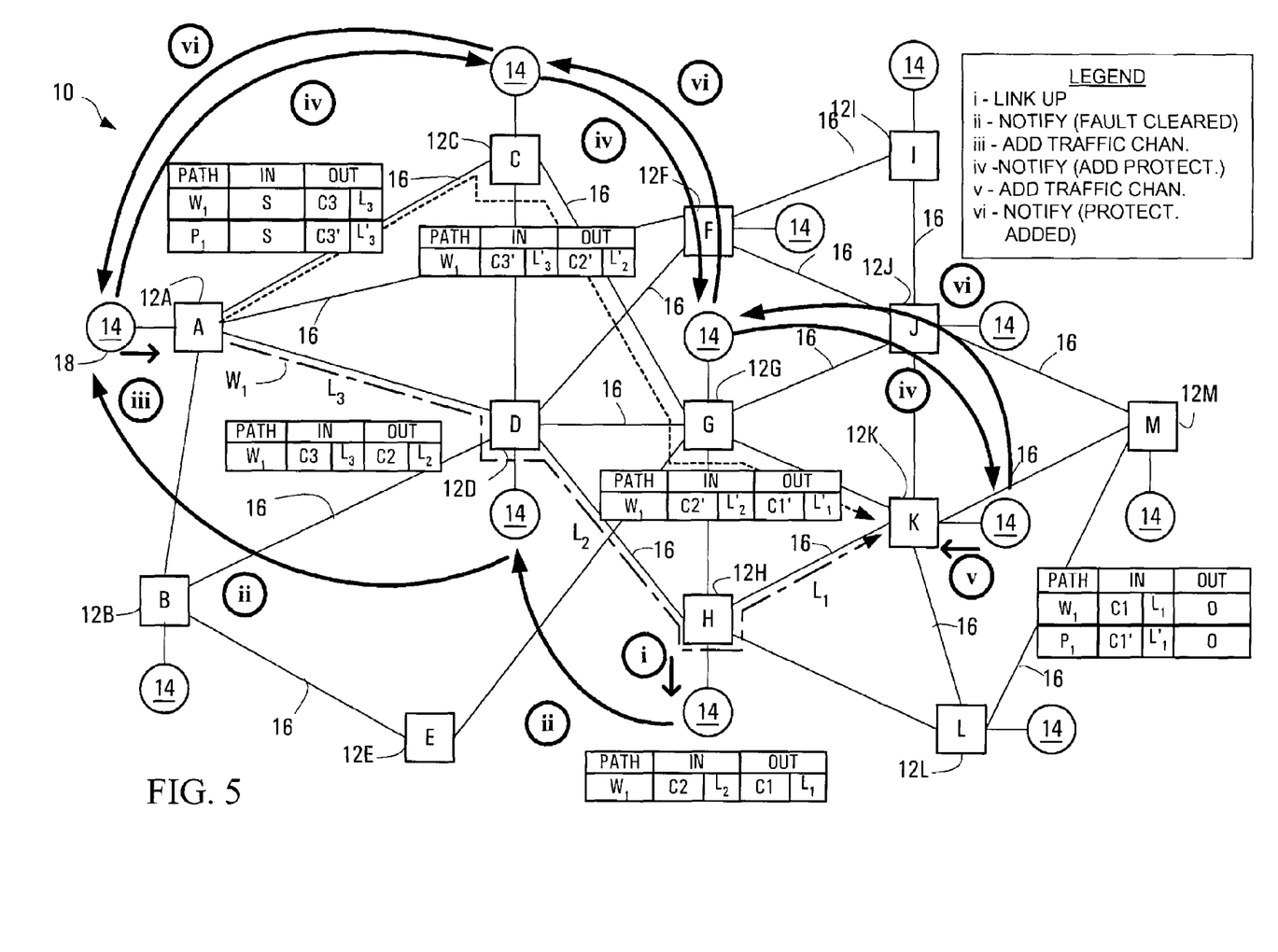
FIG. 5, illustrates the communications network of FIG. 1, including signalling between nodes as the working path of FIG. 1 is restored.
Figure 6:
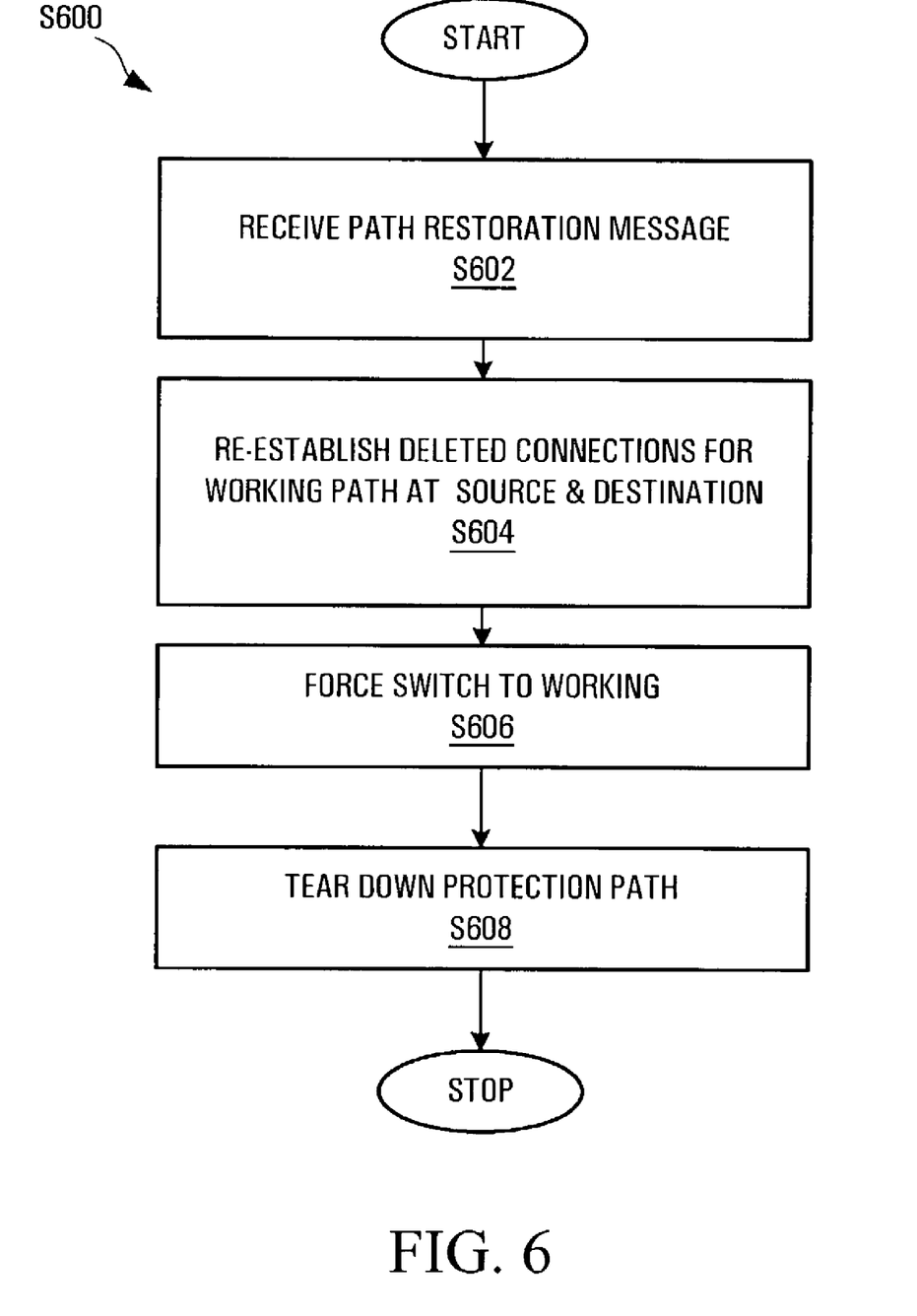
FIG. 6 illustrates exemplary steps performed at a source node of the working path of FIGS. 2, 3 and 5, in reverting traffic to the working path.

In another embodiment, if path P1 was not established in 1+1 fashion (as in FIG. 3, for example), but 1+1 path protection and switching mechanisms are available at the underlying network protocols at nodes 12, reversion of the carriage of traffic along W1 may be triggered by a series of signalling messages along W1 as detailed in FIGS. 5 and 6. Exemplary steps performed at controller A to cause reversion to W1 are illustrated in FIG. 6.

As illustrated in FIG. 5, restoration of the link 16 between H and K is as a result of the network protocol detecting restoration of the link between nodes H and K resulting in nodes H and K (LINK UP message (i) in FIG. 5) notifying their controllers 14 of the restoration. Controller at node H accordingly passes a signalling message (NOTIFY (FAULT CLEARED) message (ii) in FIG. 5) indicative of the restored link 16 to the controller 14 at source node A. Once controller 14 at node A receives this message in step S602, the controller 14 at node A re-establishes the traffic carrying channels of W1 at node A and K, (ADD TRAFFIC CHANNEL message (iii)) which were de-allocated during the establishment of P1. To effect re-allocation at node K, controller A in step S604 sends a message (NOTIFY (ADD PROTECTION) message (iv) in FIG. 5) to controller at node K over the signalling path corresponding to path W1 to re-establish connections from the working path W1 to output O. Once controller at node K receives this message it also reconnects the traffic carrying channel of W1 on node K (ADD TRAFFIC CHANNEL message (v)). Node K may then send a corresponding confirmation message (NOTIFY PROTECTION ADDED message (vi) in FIG. 5) back to controller at node A.

Upon receipt of the confirmation message by controller 14 at node A, path P1 and path W1 are related by a 1+1 path protection relationship of underlying network protocol. Reversion from path P1 to path W1 can then be effected by the underlying network protocol at nodes A and K. For example, path P1 may be torn down upon receipt of NOTIFY PROTECTION ADDED message (vi) at node A. Alternatively a switch from path P1 to path W1 can be explicitly triggered by controllers 14 at nodes A and K, as exemplified in step S606. This explicit triggering may be caused by way of a separate message exchange between controllers at nodes A and K (after message (vi)) similar to the ADD TRAFFIC CHANNEL message used to re-allocate the traffic carrying channels of path W1 at nodes A and K). Alternatively, reversion triggers may be included in the re-allocation of path W1 traffic carrying channels, i.e. once these channels are re-allocated by nodes A and K, the same nodes force a protection switch (reversion) from path P1 to path W1. In any event, once the traffic is reverted to path W1, path P1 is terminated or town down by controller A, as exemplified in step S608. This causes the labels and traffic carrying channels of P1 to be deallocated at controllers and nodes A, C, G and K.

In yet another embodiment (Example (b)), in which path P1 was not established in 1+1 fashion and 1+1 path protection and switching mechanisms are not available in network protocols supported at nodes 12, reversion to path W1 may be triggered by the path establishment protocol. That is, during termination of P1, traffic carrying channels of path P1 may be de-allocated at nodes A and K, and previously disconnected traffic carrying channels of path W1 are re-activated or reconnected.

As will be appreciated, once path P1 has been torn down, resources used by path P1 and possibly reserved by P1 will be freed. These resources may in turn be used by another working or protection path. As well, by tearing down path P1, an operator or administrator of network 10 is ensured that in the absence of fault traffic will be carried along the same path W1. Preferably, path W1 may initially be explicitly established by a network operator.

In the above examples, messages passed between controllers 14 may be MPLS or GMPLS compliant messages as modified, while messages passed between a controller 14 and a node 12 may be Bellcore TL1 message. The specific types of TL1 messages, will of course, depend on the network protocol at nodes 12. So, for SONET nodes the TL1 messages will be SONET specific; for ATM switches, they will be ATM specific.

As should now also be appreciated, in the above described embodiments, switching from working to protection path at the source node and at the destination node may be effected either through explicit messaging by the path establishment protocol, or as a result of the detection of a fault by a conventional protection switching mechanisms of network protocols of nodes 12, such as SONET or ATM APS. Similarly, switching from protection to working paths at the source node and at the destination node may be caused by a conventional protection switching mechanism or as a result of explicit messaging initiated by the path establishment protocol. Any combination of convention protection switching mechanism initiated switching and path establishment protocol protection switching at source and destination nodes is possible.

As should now also be appreciated, although an embodiment of the invention has been described in the context of an MPLS compliant signalling network, the invention may be as easily implemented in another network such as the one based on P-NNI signalling.

All documents referred to herein are hereby incorporated by reference herein for all purposes.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of operating a meshed communications network comprising:
    establishing a working path for carrying traffic between a source node and a destination node using a path establishment protocol to thereby reserve first network resources along the working path for carrying the traffic, said traffic being transported across said network in compliance with a network protocol;
    upon occurrence of a fault along said working path, establishing a protection path between said source and said destination node using said path establishment protocol to thereby reserve second network resources along the protection path for carrying the traffic between the source node and destination node, while also maintaining the established working path between the source node and destination node such that the first network resources associated with the working path continue to be reserved to carry the traffic along the working path through the network;
    switching carriage of traffic from said working path to said protection path using an automatic protection switching mechanism while maintaining the reservation of both the first network resources and the second network resources on the network;
    upon restoration of said working path, switching carriage of said traffic from said protection path to said working path using the automatic protection switching mechanism while maintaining the reservation of both the first network resources and the second network resources on the network; and
    after switching carriage of traffic from the protection path to the working path, tearing down said protection path by causing the reservation of the second network resources to be released.

2. The method of claim 1, wherein said establishing a protection path comprises establishing path connections at intermediate nodes between said source node and said destination node.

3. The method of claim 2, wherein said path connections are established using a multi-protocol label switched path protocol.

4. The method of claim 1, wherein said path establishment protocol establishes a label switched path through intermediate network nodes between said source and said destination to establish said working path.

5. The method of claim 1, wherein said network protocol includes a protection switching mechanism for switching said traffic between said working path and said protection path, and wherein said switching carriage of traffic from said working path to said protection path is caused by said network protocol.

6. The method of claim 5, wherein said switching carriage of traffic from said protection path to said working path is caused by said network protocol.

7. The method of claim 5, wherein said network protocol is one of the SONET, SDH or ATM protocols.

8. The method of claim 7, further comprising issuing a message recognized by said network protocol to cause switching carriage of traffic from said working path to said protection path using said network protocol.

9. The method of claim 8, further comprising issuing a command recognized by said network protocol to cause switching carriage of traffic from said protection path to said working path.

10. The method of claim 9, wherein said command comprises a SONET switch to protection message.

11. The method of claim 9, wherein said fault is detected by said network protocol, and signaled to said path establishment protocol.

12. The method of claim 11, wherein restoration of said working path is detected by said network protocol and signaled to said path establishment protocol.

13. The method of claim 2, wherein said tearing down comprises deleting said path connections along said protection path.

14. A node in a meshed network, said node comprising a control processor to establish paths across said meshed network using a path establishment protocol, said node operable to carry traffic across said meshed network using a network protocol, said node operable to:

establish a working path for carrying traffic between said node and a destination node using said path establishment protocol to thereby reserve first network resources along the working path for carrying the traffic, said traffic being transported across said network in compliance with a network protocol;

upon occurrence of a fault along said working path, establish an alternate protection path, between said node and said destination node, using said path establishment protocol to thereby reserve second network resources along the protection path for carrying the traffic between the node and destination node, while also maintaining the established working path;

switch carriage of traffic from said working path to said protection path using the automatic protection switching mechanism while maintaining the reservation of both the first network resources and the second network resources on the network;

upon restoration of said working path, switch carriage of said traffic from said protection path to said working path using the automatic protection switching mechanism while maintaining the reservation of both the first network resources and the second network resources on the network; and after switching carriage of traffic from the protection path to the working path tearing down said protection path by causing the reservation of the second network resources to be released;

wherein said switch from said working path to said protection channel is effected by said network protocol.

15. The node of claim 14, wherein said switching from said protection to said working is effected by said network protocol.

16. Computer readable medium, storing processor readable instructions loadable at a node within a meshed network, that cause said node to a. establish a working path for carrying traffic between a source node and a destination node using a path establishment protocol to thereby reserve first network resources along the working path for carrying the traffic, said traffic being transported across said network in compliance with a network protocol;

b. upon occurrence of a fault along said working path, establish an alternate protection path, between said source and said destination node using said path establishment protocol to thereby reserve second network resources along the protection path for carrying the traffic between the source and destination node, while also maintaining the established working path between the source and destination node such that the first network resources associated with the working path continue to be reserved to carry the traffic along the working path through the network;

c. switch carriage of traffic from said working path to said protection path, after establishment of said protection path using the automatic protection switching mechanism while maintaining the reservation of both the first network resources and the second network resources on the network;

d. upon restoration of said working path, switch carriage of said traffic from said protection path to said working path; using the automatic protection switching mechanism while maintaining the reservation of both the first network resources and the second network resources on the network; and e. after switching carriage of traffic from the protection path to the working path, tear down said protection path by causing the reservation of the second network resources to be released.

* * * * *